(12) United States Patent
Lyle et al.

(10) Patent No.: US 7,970,837 B2
(45) Date of Patent: Jun. 28, 2011

(54) METHOD TO INVITE USERS TO A VIRTUAL WORLD USING INSTANT MESSAGING

(75) Inventors: Ruthie D. Lyle, Durham, NC (US);
Ulysses Lamont Cannon, Durham, NC (US); Angela Richards Jones, Durham, NC (US); Susan Stanford McVey, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 77 days.

(21) Appl. No.: 12/119,031

(22) Filed: May 12, 2008

(65) Prior Publication Data

US 2009/0282109 A1 Nov. 12, 2009

(51) Int. Cl.
*G06F 15/16* (2006.01)
(52) U.S. Cl. ......... 709/206; 709/205; 709/217; 715/758
(58) Field of Classification Search .................. 709/205, 709/217, 206; 715/758
See application file for complete search history.

(56) References Cited

U.S. PATENT DOCUMENTS

6,758,746 B1 * 7/2004 Hunter et al. ..................... 463/9
2006/0184886 A1 * 8/2006 Chung et al. .................. 715/758
2007/0288598 A1 * 12/2007 Edeker et al. ................. 709/217
* cited by examiner

*Primary Examiner* — Kyung-Hye Shin
(74) *Attorney, Agent, or Firm* — Hamilton & Terrile, LLP; Stephen A. Terrile (57) ABSTRACT

A method, system and computer-usable medium are disclosed for initiating a session in a virtual world. An instant messaging system (IMS) comprises a registry of IMS user identifiers cross-referenced to their corresponding virtual world user identifiers. A first IMS user implements a virtual world invitation module as a result of an IMS session to invite a second IMS user to participate in a virtual world session. The first IMS user selects the IMS user identifier of the second IMS user, followed by selection of a target virtual world and a virtual world identifier. Once completed, the invitation is sent the IMS user identifier of the second IMS user, who receives the invitation and signifies their acceptance or declination. If accepted, the cross-referenced virtual world user identifiers of the first and second IMS users are used to log them into the agreed-upon virtual world venue and initiate a virtual world session.

14 Claims, 9 Drawing Sheets

| IMS User Identifier 304 | Virtual World '1' 306 | Virtual World '2' 308 |
|---|---|---|
| AliceDyer@us.ibm.com 310 | Keturah Reno 320 | Cashmere Smith 330 |
| AliceDyer@us.ibm.com 310 | Deep Fathom 322 | ••• 332 |
| BobJones@us.ibm.com 314 | ••• 324 | Max Diamond 334 |
| EllenRogers@us.ibm.com 316 | Alpha Leader 326 | Bright Star 336 |
| NancySmith@us.ibm.com 318 | Team Player 328 | Delf Tone 338 |

METHOD TO INVITE USERS TO A VIRTUAL WORLD USING INSTANT MESSAGING

BACKGROUND OF THE INVENTION

1. Field of the Invention

Embodiments of the disclosure relate in general to the field of computers and similar technologies, and in particular to software utilized in this field. Still more particularly, it relates to initiating a session in a virtual world.

2. Description of the Related Art

An instant messaging system (IMS) provides a simple way to exchange real-time, text-based messages between users who are connected to on-line or electronic networking environments such as the Internet, intranets, and extranets. These systems, which have gained popularity due to their simplicity and ease of use, allow users to extend invitations to other users to exchange messages with multiple participants. However, IMS sessions are generally text-based, which can limit their effectiveness. As a result, there are cases when an instant messaging session is not the ideal environment for interaction between users and it would be preferable to provide an alternative.

Accordingly, the use of virtual worlds, which are typically graphically-oriented, have gained popularity in recent years as a new medium for instruction, collaboration, and transactional exchanges. In general, a virtual world, which is sometimes referred to as a metaverse, is a computer-based simulated environment intended for its users to inhabit and interact via avatars. An avatar, as typically implemented, is an electronic representation of a user, such as a two-dimensional icon or a three-dimensional, animated figure. Within a virtual world, avatars interact with each other much as their human counterparts do in the real world.

As such, there are times when a virtual world session is better suited for the needs at hand than an IMS session. Sometimes, this realization occurs during an IMS session. However, shifting from an IMS session to a virtual world session can prove to be challenging. As an example, IMS messages need to be exchanged between IMS session participants to determine whether each IMS session participant has a user identifier registered with a virtual world, and if they do, which one. Then agreement has to be reached regarding not just which virtual world to use, but the preferred location to meet within the virtual world once it is selected. Once agreement is reached, each IMS user then has to log out of the IMS session and then log into the virtual world session and be able to identify themselves through their respective avatars. As another example, the launching of a virtual world client may preclude the concurrent use of an IMS client, further complicating communication while initiating the virtual world session. As yet another example, the absence of integration between an IMS application and a virtual world application may preclude the transfer of IMS session histories and transcripts, along with their associated characteristics and attributes, to a virtual world session. In view of the foregoing, it would be advantageous to be able to initiate a virtual world session with other IMS users as a result of an instant messaging system (IMS) session.

BRIEF SUMMARY OF THE INVENTION

The present invention includes, but is not limited to, a method, system and computer-usable medium for initiating a virtual world session as a result of an instant messaging system (IMS) session. In various embodiments, an IMS comprises a registry of IMS user identifiers and corresponding virtual world identity information. The IMS user registry further comprises a virtual world identity table, which cross-references IMS user identifiers to their corresponding virtual world user identifiers. In these and other embodiments, an IMS user uses an IMS client to participate in an IMS session with other IMS users.

In one embodiment, a first IMS user composes an invitation to a second IMS user during the IMS session to invite them to participate in a virtual world session. To compose the invitation, a virtual world invitation module is implemented by the first user within the user interface (UI) of their instant messaging client. The first user selects the IMS user identifier of the IMS user they wish to invite, followed by selection of a target virtual world and a virtual world identifier, which is stored in the IMS registry. Once composition of the invitation is completed, it is originated by sending it to the IMS user identifier of the second IMS user.

In one embodiment, the invitation is received by the second IMS user, who signifies their acceptance or declination of the invitation by using a virtual world invitation module implemented within the UI of their IMS client. In another embodiment, the second IMS user does not have a user identity registered in the virtual world selected by the originator of the virtual world invitation. Accordingly, the second IMS user responds with a suggestion for an alternate virtual world venue for the session. The response, which includes the virtual world user identifier for the second IMS user in the alternate virtual world venue is then sent to the first IMS user. If accepted, the first and second IMS users log into the agreed-upon virtual world venue and conduct a virtual world session. In one embodiment, the first and second IMS users are automatically logged into the agreed-upon virtual world venue. In another embodiment the first and second IMS users are represented in the agreed-upon virtual world by their respective avatars. In yet another embodiment, the session in the virtual world is secured. The above, as well as additional purposes, features, and advantages of the present invention will become apparent in the following detailed written description.

BRIEF DESCRIPTION OF THE DRAWINGS

Selected embodiments of the present invention may be understood, and its numerous objects, features and advantages obtained, when the following detailed description is considered in conjunction with the following drawings, in which.

DETAILED DESCRIPTION

A method, system and computer-usable medium are disclosed for initiating a virtual world session as a result of an instant messaging system (IMS) session. As will be appreciated by one skilled in the art, the present invention may be embodied as a method, system, or computer program product. Accordingly, embodiments of the invention may be implemented entirely in hardware, entirely in software (including firmware, resident software, micro-code, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therein, either in baseband or as part of a carrier wave. The computer usable program code may be transmitted using any appropriate medium, including but not limited to the Internet, wireline, optical fiber cable, radio frequency (RF), etc.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Figure 1:
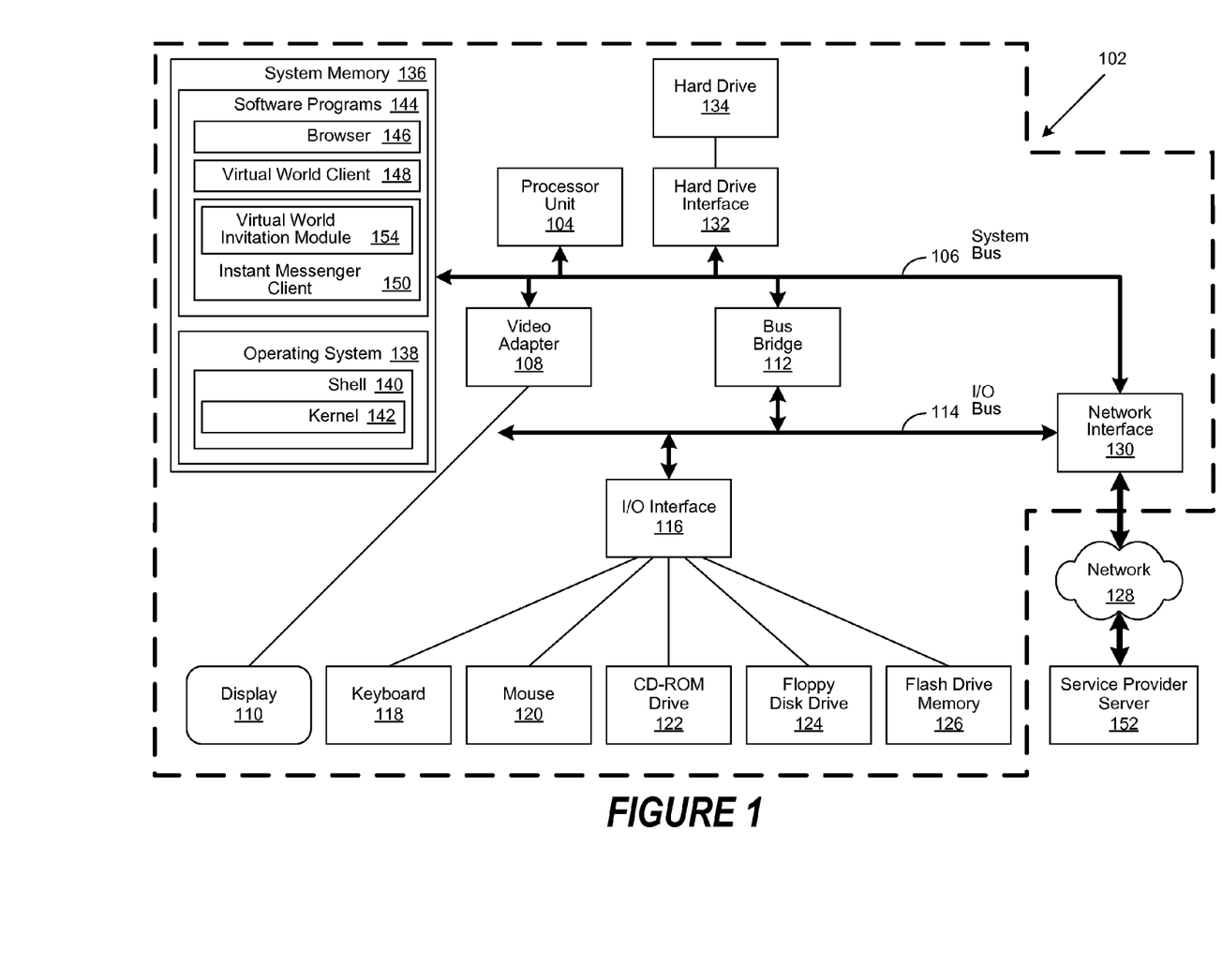
FIG. 1 depicts an exemplary client computer in which the present invention may be implemented.

FIG. 1 is a block diagram of an exemplary client computer 102 in which the present invention may be utilized. Client computer 102 includes a processor unit 104 that is coupled to a system bus 106. A video adapter 108, which controls a display 110, is also coupled to system bus 106. System bus 106 is coupled via a bus bridge 112 to an Input/Output (I/O) bus 114. An I/O interface 116 is coupled to I/O bus 114. The I/O interface 116 affords communication with various I/O devices, including a keyboard 118, a mouse 120, a Compact Disk-Read Only Memory (CD-ROM) drive 122, a floppy disk drive 124, and a flash drive memory 126. The format of the ports connected to I/O interface 116 may be any known to those skilled in the art of computer architecture, including but not limited to Universal Serial Bus (USB) ports.

Client computer 102 is able to communicate with a service provider server 152 via a network 128 using a network interface 130, which is coupled to system bus 106. Network 128 may be an external network such as the Internet, or an internal network such as an Ethernet Network or a Virtual Private Network (VPN). Using network 128, client computer 102 is able to use the present invention to access service provider server 152.

A hard drive interface 132 is also coupled to system bus 106. Hard drive interface 132 interfaces with a hard drive 134. In a preferred embodiment, hard drive 134 populates a system memory 136, which is also coupled to system bus 106. Data that populates system memory 136 includes the client computer's 102 operating system (OS) 138 and software programs 144.

OS 138 includes a shell 140 for providing transparent user access to resources such as software programs 144. Generally, shell 140 is a program that provides an interpreter and an interface between the user and the operating system. More specifically, shell 140 executes commands that are entered into a command line user interface or from a file. Thus, shell 140 (as it is called in UNIX®), also called a command processor in Windows®, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. While shell 140 generally is a text-based, line-oriented user interface, the present invention can also support other user interface modes, such as graphical, voice, gestural, etc.

As depicted, OS 138 also includes kernel 142, which includes lower levels of functionality for OS 138, including essential services required by other parts of OS 138 and software programs 144, including memory management, process and task management, disk management, and mouse and keyboard management.

Software programs 144 may include a browser 146 and email client 148. Browser 146 includes program modules and instructions enabling a World Wide Web (WWW) client (i.e., client computer 102) to send and receive network messages to the Internet using HyperText Transfer Protocol (HTTP) messaging, thus enabling communication with service provider server 152. Software programs 144 also include an instant messaging client 150 and a virtual world invitation module 154. The virtual world invitation module 154 includes code for implementing the processes described in FIGS. 2 through 5 described hereinbelow. In one embodiment, client computer 102 is able to download the virtual world invitation module 154 from a service provider server 154.

The hardware elements depicted in client computer 102 are not intended to be exhaustive, but rather are representative to highlight components used by the present invention. For instance, client computer 102 may include alternate memory storage devices such as magnetic cassettes, Digital Versatile Disks (DVDs), Bernoulli cartridges, and the like. These and other variations are intended to be within the spirit and scope of the present invention.

Figure 2:
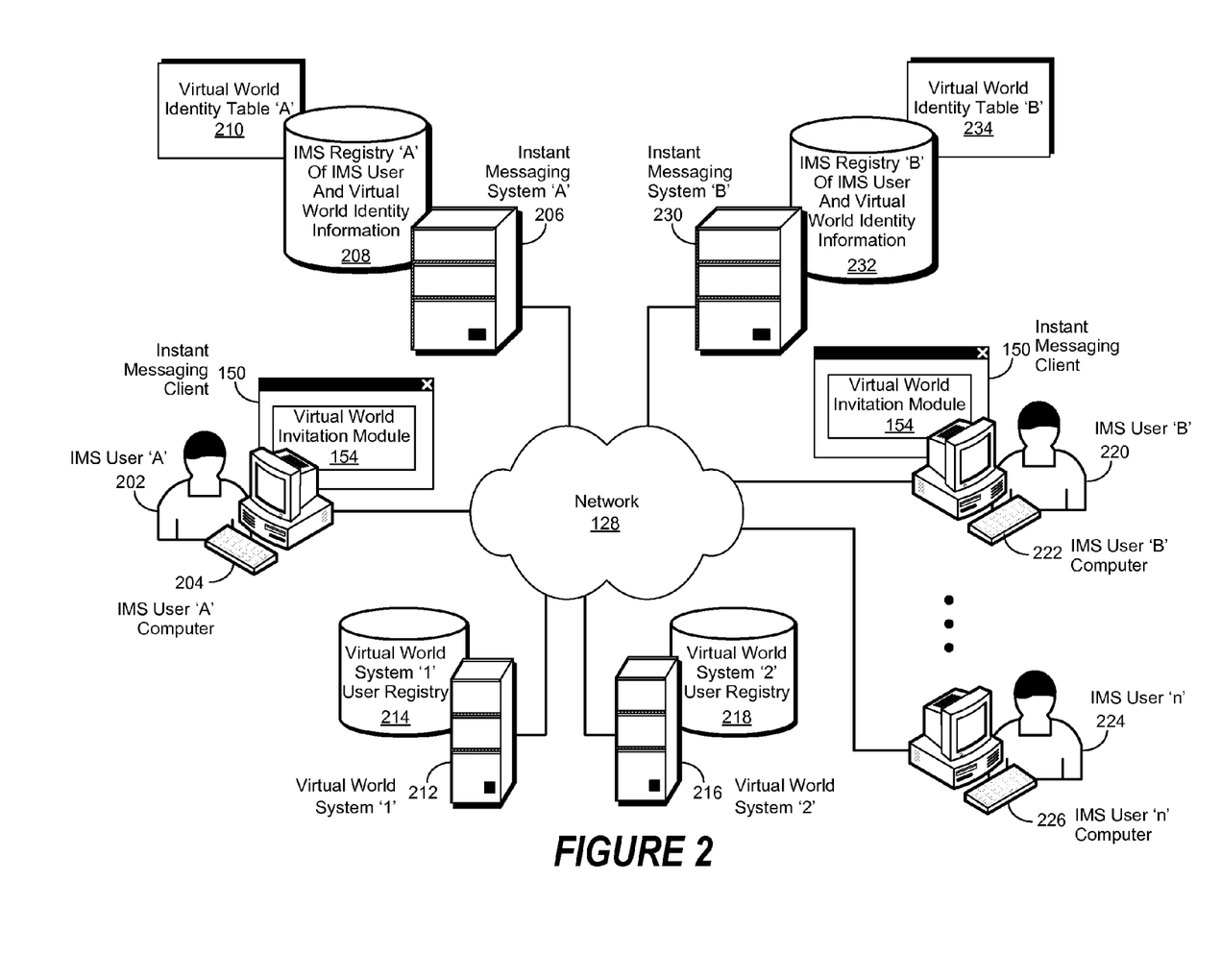
FIG. 2 shows a simplified block diagram of a virtual world invitation module as implemented with an instant messaging system (IMS)

FIG. 2 shows a simplified block diagram of a virtual world invitation module as implemented with an instant messaging system (IMS) in accordance with an embodiment of the invention. In various embodiments, instant messaging system 'A' 206 comprises an IMS user registry 'A; 208 of IMS user identifiers and corresponding virtual world identity information. The IMS user registry 'A' 208 further comprises a virtual world identity table 'A' 210, which cross-references the IMS user identifiers of the users of instant messaging system 'A' 206 to their corresponding virtual world user identifiers. Likewise, instant messaging system 'B' 230 comprises an IMS user registry 'B; 232 of IMS user identifiers and corresponding virtual world identity information. The IMS user registry 'B' 232 further comprises a virtual world identity table 'B' 234, which cross-references the IMS user identifiers of the users of instant messaging system 'B' 230 to their corresponding virtual world user identifiers. In one embodiment, IMS user 'A' 202 and IMS users 'B' 220 through 'n' 224 are users of instant messaging system 'A' 206, which is used to conduct an IMS session. In another embodiment, IMS user 'A' 202 is a user of instant messaging system 'A' 206, and IMS users 'B' 220 through 'n' 224 are users of instant messaging system 'B' 230, and both instant messaging systems 'A' 206 nd 'B' 230 are used to conduct an IMS session. In yet another embodiment, IMS user 'A' 202 establishes a connection with network 128 and then uses an IMS client 150 on their computer 204 to interact with either instant messaging system 'A' 206 or 'B' 230 to conduct an IMS session with IMS users 'B' 220 through 'n' 224.

In one embodiment, IMS user 'A' 202 is logged into instant messaging system 'A' 206 and is participating in an IMS session. During the IMS session, IMS user 'A' 202 decides to originate an invitation for a virtual world session to one or more of IMS users 'B' 220 through 'n' 224. As used herein, a virtual world, sometimes referred to as a metaverse, is a computer-based simulated environment intended for its users to inhabit and interact via avatars. An avatar, as used herein, is an electronic representation of a user, such as a two-dimensional icon or a three-dimensional, animated figure. To originate the invitation to the virtual world session, user 'A' 202 uses a virtual world invitation module 154 within the user interface (UI) of his instant messaging client 150 to begin composing the invitation.

IMS user 'A' then selects the IMS user identifiers of IMS users 'B' 220 through 'n' 224 that are to receive the invitation. In one embodiment, IMS user 'A' 202 and IMS users 'B' 220 through 'n' 224 are users of instant messaging system 'A' 206. In this embodiment, the IMS user identifier and any corresponding virtual world user identifiers are stored in the IMS registry 'A' 208 and cross-referenced to each other in the virtual world identity table 210. Accordingly, the cross-referenced user identifiers are automatically displayed within a user interface window of the instant messaging client 150 of IMS user 'A' 202. The IMS user 'A' 202 then uses the displayed user identifiers to select the recipients of the invitation. Once the invitation recipients are selected, user 'A' 2020 selects a target virtual world, such as that maintained by virtual world system '1' 212 or virtual world system '2' 216 for the virtual world session. Once a target virtual world is selected, IMS user 'A' 202 selects a virtual world identifier, which is stored in the IMS registry 'A' 208, for their use in the selected virtual world. In one embodiment, the selected virtual world identifier is cross-referenced in the virtual world identity table 'A' 210 to their IMS identifier as described in greater detail in FIG. 3.

Once composition of the invitation is completed, it is originated by sending it to one or more recipient IMS users 'B' 220 through 'n' 224. In one embodiment, as shown in FIG. 2, the invitation is received by IMS user 'B' 220 using a virtual world invitation module 154 within the UI of the IMS client 150 running on their computer 222. In another embodiment, the invitation is received by IMS user 'n' 214 using a virtual world invitation module 154 within the UI of the IMS client 150 running on their computer 226. In one embodiment, IMS user 'B' 220 signifies their acceptance or declination of the invitation by using virtual world invitation module 154 within the UI of the IMS client 150. In another embodiment, IMS user 'B' 220 does not have a user identity registered in the virtual world user registry 214 for the virtual world system '1' 212 selected by the originator of the virtual world invitation. Accordingly, IMS user 'B' 220 suggests an alternate venue for the session, such as virtual world system '2' 216. The response, which includes the virtual world user identifier for IMS user 'B' 220 registered in the virtual world user registry 218 for virtual world system '2' 216, is then sent back to IMS user 'A' 202. If accepted, IMS users 'A' 202 and 'B' 220 log into the agreed-upon virtual world venue and conduct a virtual world session. In one embodiment, IMS users 'A' 202 and 'B' 220 are automatically logged into the agreed-upon virtual world venue. In another embodiment, IMS users 'A' 202 and 'B' 220 are represented by their respective avatars in the virtual world session. In yet another embodiment, the virtual world session is secured.

Figure 3:
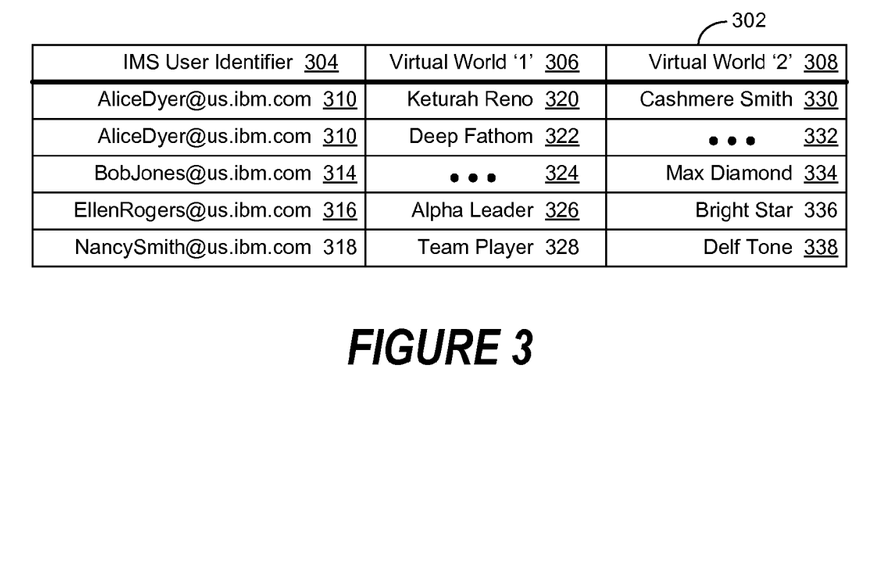
FIG. 3 shows a simplified IMS user identity to virtual world identity translation table.

FIG. 3 shows a simplified instant messaging system (IMS) user identity to virtual world identity translation table as implemented in accordance with an embodiment of the invention. In this embodiment, a plurality of IMS user identifiers 304 are cross-referenced to a corresponding user identifier for virtual world '1' 306 and virtual world '2' 308. As shown in FIG. 3, the IMS user identity 304 of 'AliceDyer@us.ibm.com' 310 is cross-referenced to corresponding user identities 'Keturah Reno' 320 for virtual world '1' 306 and 'Cashmere Smith' 330 for virtual world '2' 308. In one embodiment, the IMS user identity of a user is cross-referenced to a plurality of corresponding user identities in a virtual world, such as virtual world '1' 306. As shown in FIG. 3, the IMS user identity 304 of 'AliceDyer@us.ibm.com' 310 is also cross-referenced to a second corresponding user identity 'Deep Fathom' 322 for virtual world '1' 306 and a null entry 332 for virtual world '2' 308. Likewise, the IMS user identity 304 of 'BobJones@us.ibm.com' 314 is cross-referenced to a corresponding null entry 324 for virtual world '1' 306 and 'Max Diamond' 334 for virtual world '2' 308. As likewise shown in FIG. 3, the IMS user identity 304 of 'EllenRogers@us.ibm.com' 316 is cross-referenced to corresponding user identities 'Alpha Leader' 326 for virtual world '1' 306 and 'Bright Star' 336 for virtual world '2' 308. As also shown, the IMS user identity 304 of 'NancySmith@us.ibm.com' 310 is cross-referenced to corresponding user identities 'Team Player' 320 for virtual world '1' 306 and 'Delf Tone' 330 for virtual world '2' 308.

Figure 4A:
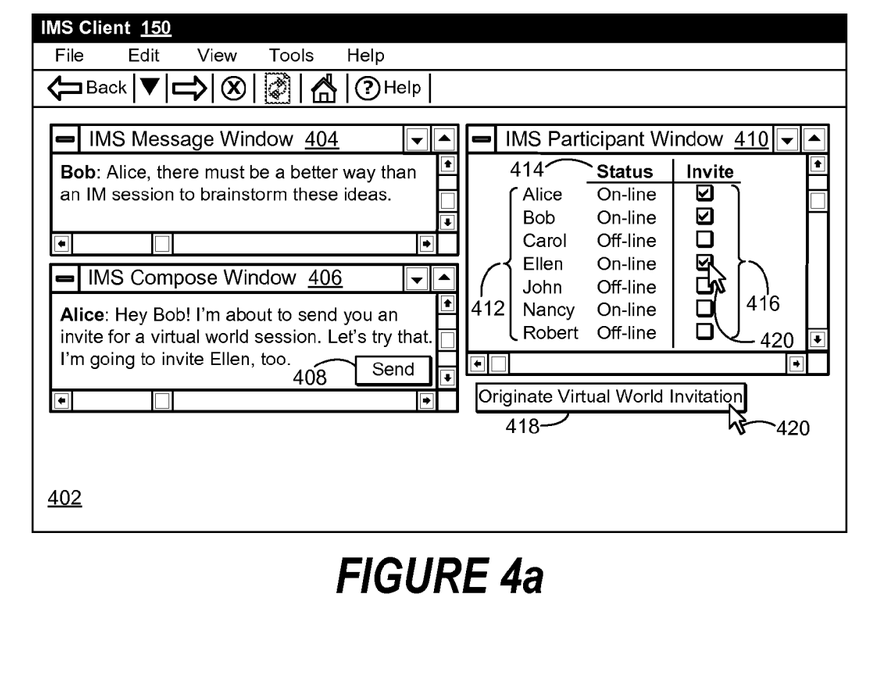
FIGS. 4*a-c* show the implementation of a virtual world invitation module as implemented within the user interface (UI) of an IMS client.
Figure 4B:
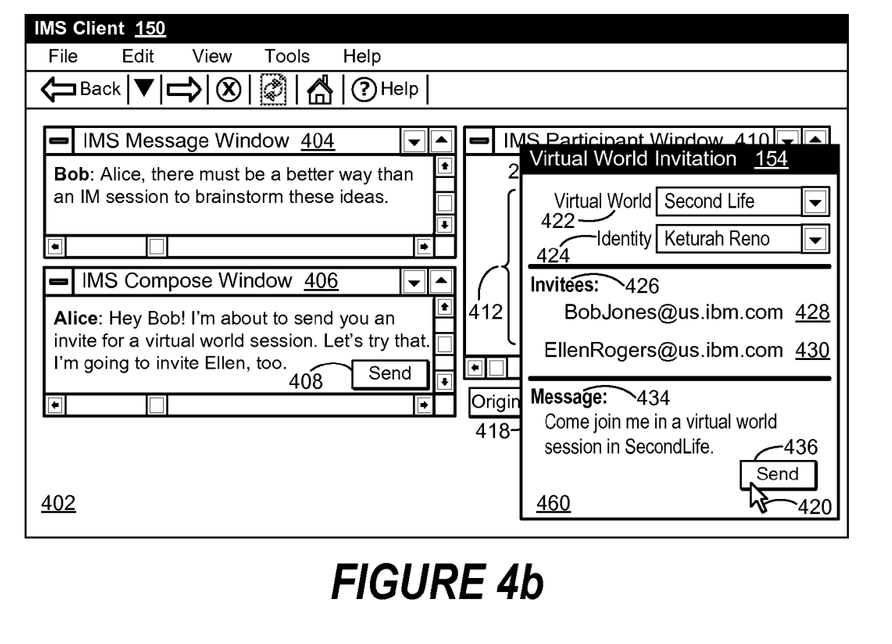
Figure 4C:
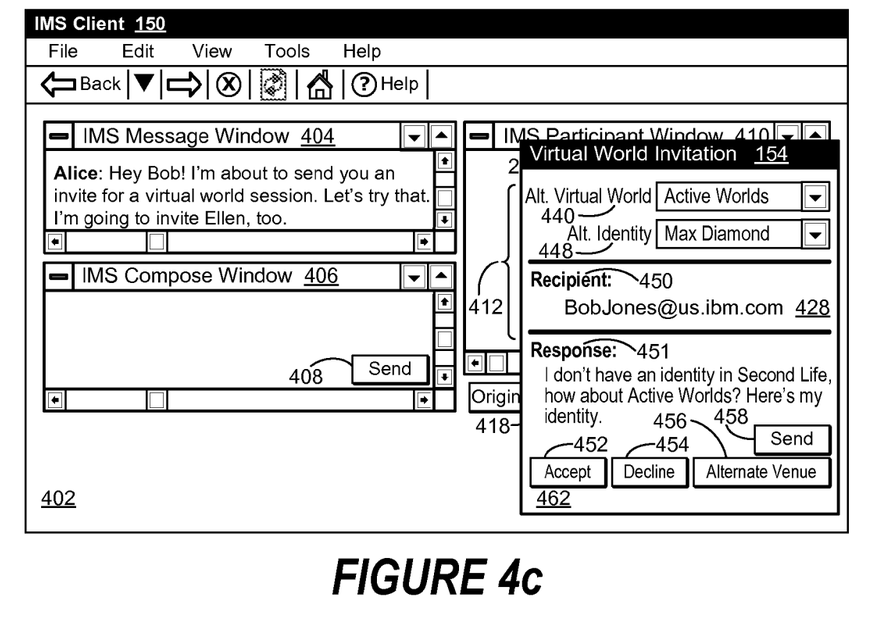
Figure 5A:
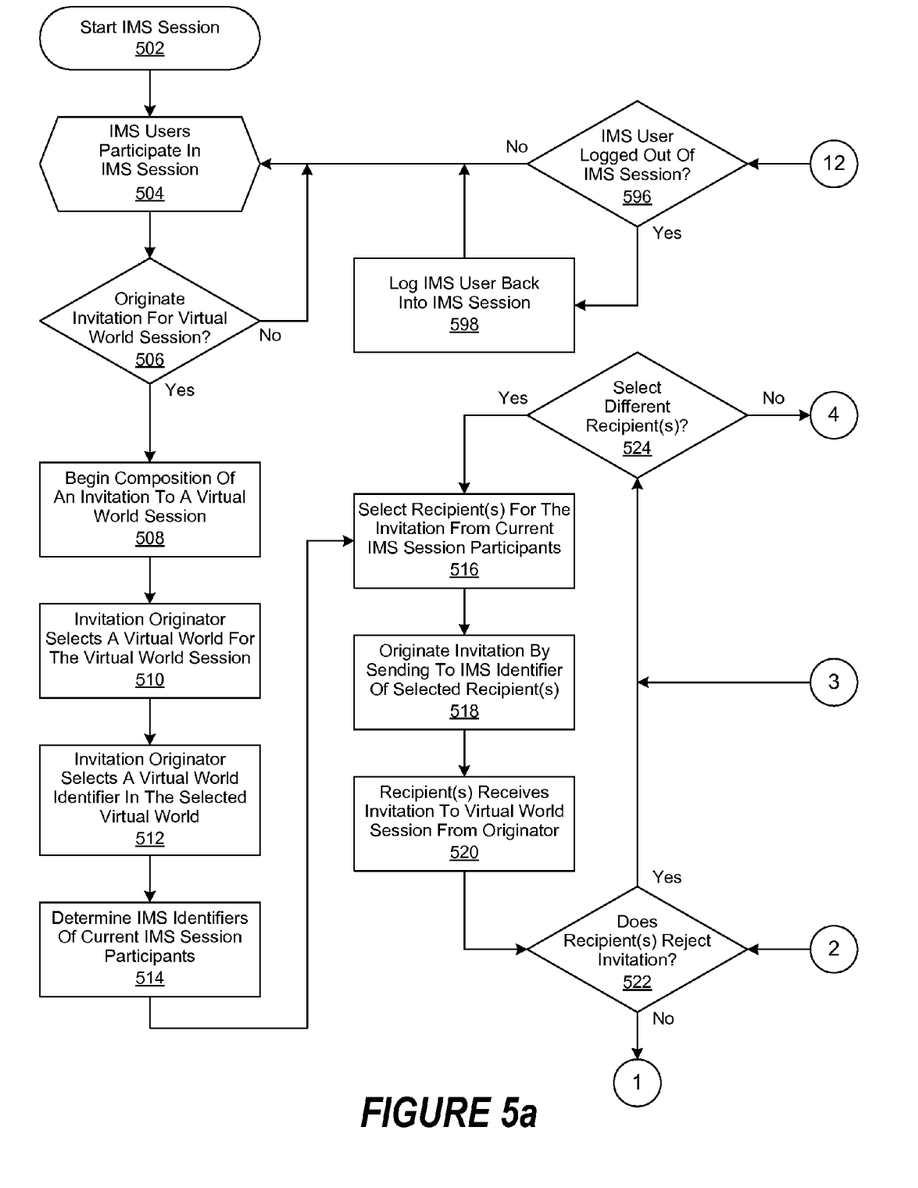
FIGS. 5*a-e* are a flow chart of a virtual world invitation module as implemented with an IMS.
Figure 5B:
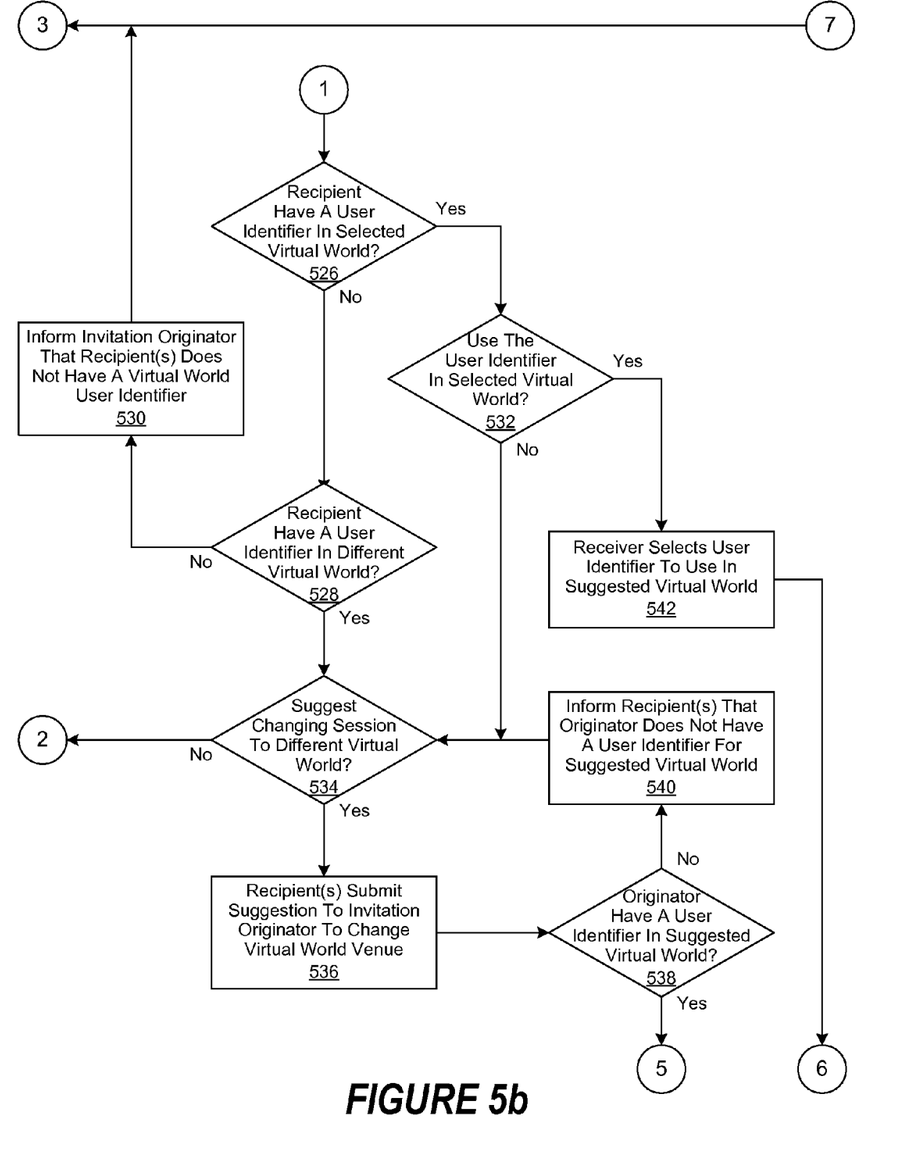
Figure 5C:
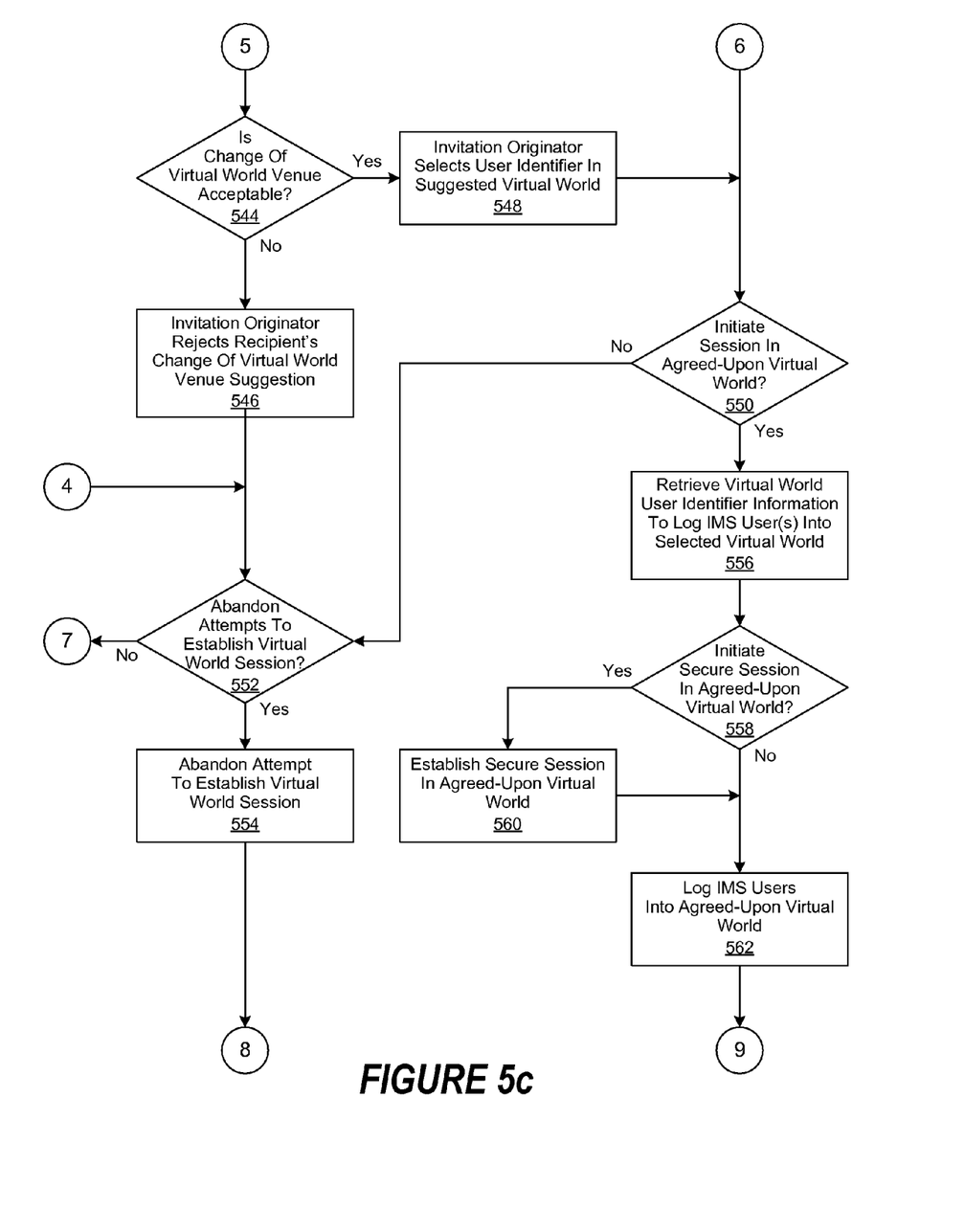
Figure 5D:
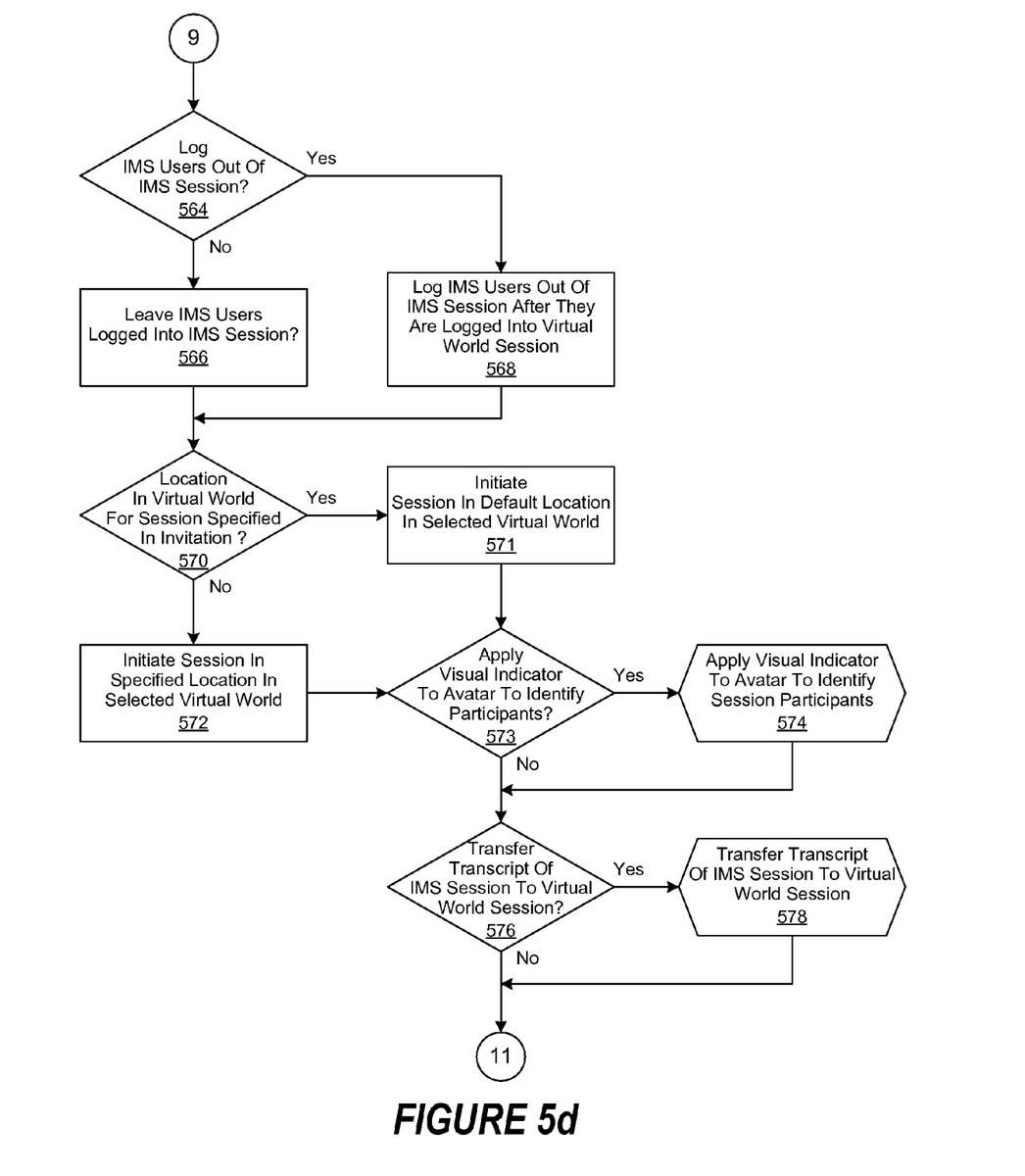
Figure 5E:
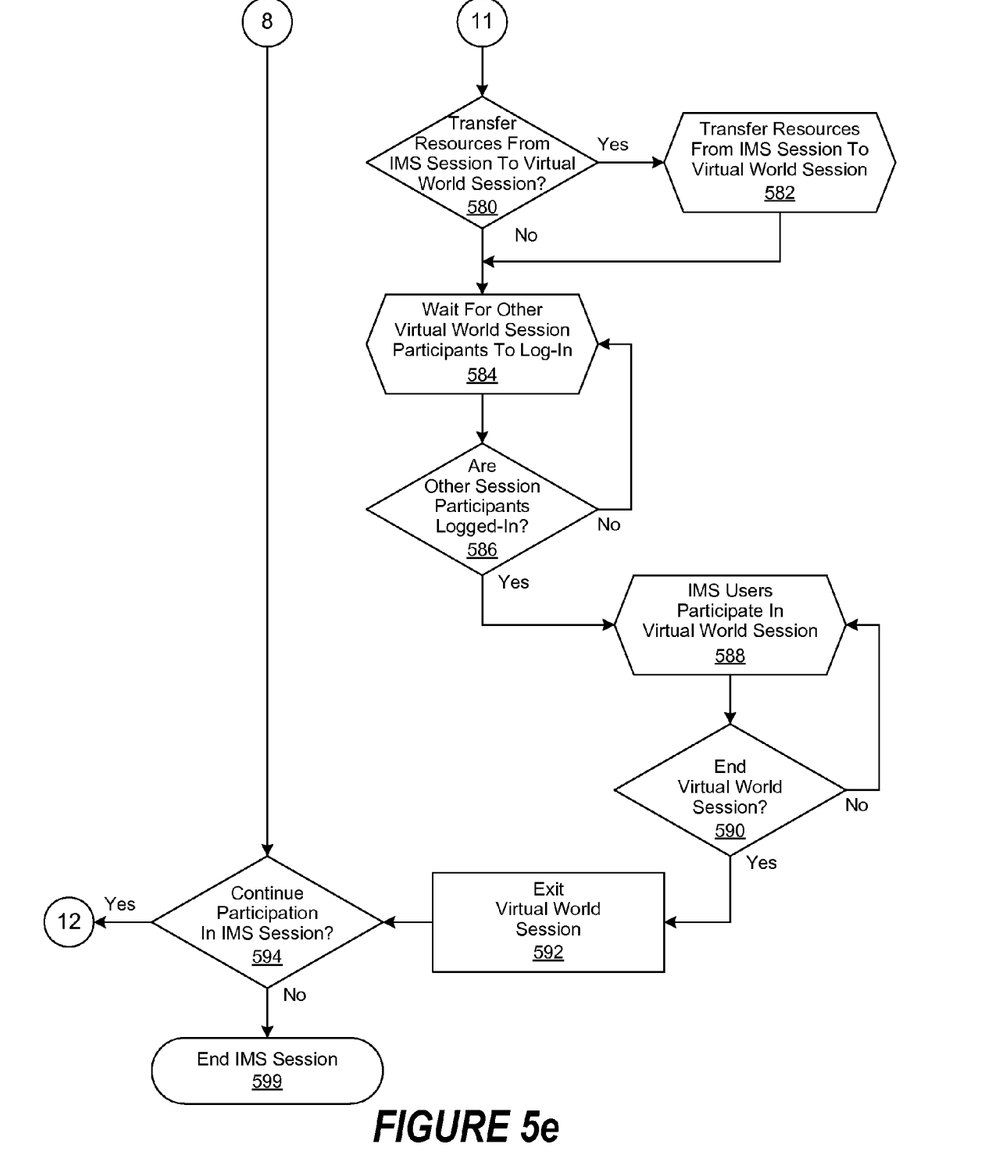

FIGS. 4a-c show the implementation of a virtual world invitation module as implemented within the user interface (UI) of an instant messaging system (IMS) client in accordance with an embodiment of the invention. As shown in FIG. 4a, a window 402 of an IMS client 150 comprises an IMS Message window 404, IMS Compose window 406, and IMS Participant window 410. During an IMS session, messages from other IMS participants are displayed in IMS Message window 404. Responses to the messages are composed within the IMS Compose window 406, and then sent to other IMS session participants through a user gesture, such as by placing cursor 420 over the Send command button 408, followed by a user gesture such as a mouse click. Active IMS users 412 are displayed in IMS Participant window 410, along with their IMS session status 414. For example, a session status of "on-line" signifies they are logged into the IMS session, but may not be participating, while a session status of "off-line" signifies they are neither participating nor logged into the IMS session.

In one embodiment, an IMS user decides to originate an invitation for a virtual world session to other IMS session participants. In this embodiment, the IMS user selects invitees through a user gesture, such as placing the cursor 420 over the Invite selection box 416 corresponding to each invitee, followed by another user gesture, such as a mouse click. Once the invitees have been selected, the IMS user then selects the Originate Virtual World Invitation command button 418 with a similar user gesture to begin composing an invitation to a virtual world session.

As a result, as shown in FIG. 4b, a Compose window 460 of a Virtual World Invitation module 154 is displayed within window 402 of IMS client 150. The Compose window 460 comprises a selected Virtual World field 422 and a User Identity field 424 to use in the selected virtual world. As also shown in FIG. 4b, the IMS user has selected a user identity 424 of 'Keturah Reno' to use in the virtual world 422 of 'Second Life'. The Compose window 460 likewise comprises invitees 426 'BobJones@us.ibm.com' 428 and 'EllenRogers@us.ibm.com' 430, and an area for a Message 434. Once virtual world 422 and user identity 424 has been selected and message 434 has been composed, the composed virtual world invitation is originated by the application of a user gesture, such as by placing cursor 420 on Send command button 436, followed by a mouse click. The originated virtual world invitation is then received by the invitee. As shown in FIG. 4c, the recipient uses a Response window 462 of the Virtual World Invitation module 154 to respond to the originator. The recipient signifies their acceptance or declination of the invitation by respectively the Accept command button 452 or the Decline command button 454 with a user gesture as described in greater detail herein.

In one embodiment the invitee does not have a user identity for the virtual world 422 selected by the originator of the virtual world invitation. Accordingly, the recipient selects the Alternate Venue command button 456 with a user gesture. As a result, an Alternative Virtual World field 440 and an Alternate User Identity field 448 is displayed within the Response window 462. As shown in FIG. 4c, the Recipient 450 'BobJones@us.ibm.com' 428 has suggested 'Active Worlds' as an alternative virtual world venue for the session and has included 'Max Diamond' as his user identity in 'Active Worlds'. The Response window 462 also comprises a Response 451 message area. Once the Response window 462 has been populated, the recipient selects the Send command button 458 with a user gesture to send the response to the originator of the virtual world invitation.

FIGS. 5a-e are a flow chart of a virtual world invitation module as implemented with an instant messaging system (IMS) in accordance with an embodiment of the invention. In this embodiment, an IMS session is started in step 502 followed by IMS users participating in the IMS session in step 504. A decision is made in step 506 whether to originate an invitation for other IMS users to participate in a virtual world session. If not, then participation in the IMS session continues, proceeding with step 504. Otherwise, an IMS user begins composition of an invitation to a virtual world session in step 508. In one embodiment, a virtual world invitation module is invoked from within the user interface of the IMS user's IMS client to compose the invitation to the virtual world session. Once composition of the invitation to the virtual world session is initiated, the IMS user selects a target virtual world in step 510 for the virtual world session. Once a target virtual world is selected, the IMS user selects a virtual world identifier in step 512 for use in the target virtual world. In one embodiment, the virtual world identifier is an avatar. As used herein, an avatar is an electronic representation of a user, such as a two-dimensional icon or a three-dimensional, animated figure.

The IMS user identifiers of IMS users currently participating in the IMS session are then determined in step 514. One or more recipients for the invitation to the virtual world session are then selected in step 516 from IMS users that are currently participating in the IMS session. Once composition of the invitation to the virtual world session is completed, it is then originated by sending it to the selected IMS users in step 518. In one embodiment, recipients that are not currently participating in the IMS session are also selected. In this embodiment, the invitation is originated by sending an electronic mail (email) message to an email address corresponding to the recipient's IMS user identifier. The recipients then receive the invitation to the virtual world session from the invitation originator in step 520.

A decision is then made in step 522 whether the invitation to the virtual world session has been rejected by a recipient. If so, then a decision is made in step 524 whether or not to select different recipients for the invitation to the virtual world session. Is so, the process continues, proceeding with step 516. Otherwise, a decision is made in step 552 whether to abandon attempts to establish the virtual world session. If so, then attempts to establish the virtual world session are abandoned in step 554, followed by a making a decision in step 572 whether to continue the IMS session. If it is decided in step 572 to discontinue the IMS session, then it is ended in step 599. Otherwise, the process continues, proceeding to step 504 where the IMS users continue to participate in the IMS session. However, if it is decided in step 552 to not abandon attempts to establish invitation to the virtual world session, then the process continues, proceeding to step 524 where a decision is made whether or not to select different recipients for the invitation.

However, if it is decided in step 522 that the invitation to the virtual world session has not been rejected by a recipient, then a decision is made in step 526 whether the recipient has a user identifier for the virtual world selected by the originator of the invitation. If not, a decision is made in step 528 whether the recipient has a user identifier for another virtual world. If not, then the originator of the invitation to the virtual world session is so informed in step 530. The process then continues, proceeding to step 524. However, if it is decided in step 528 that the recipient has a user identifier in a different virtual world, then a decision is made in step 534 whether to suggest changing the venue of the session to a different virtual world. If it is decided in step 534 to not make such a suggestion, then the process continues, proceeding to step 522. Otherwise, the recipient submits a suggestion to the originator of the invitation to the virtual world session in step 536 to change the venue of the session to a different virtual world. A decision is then made in step 538 whether the originator of the invitation has a user identifier in the suggested virtual world. If not, the recipient of the invitation is informed as such in step 540 and the process continues, proceeding to step 534. Otherwise, a decision is made in step 544 by the originator of the invitation whether the suggested change of venue to the different virtual world is acceptable. If not, then the originator of the invitation rejects the recipient's suggested change of virtual world venue in step 546. A decision is then made step 552 whether to abandon attempts to establish the virtual world session. If so, then attempts to establish the virtual world session are abandoned in step 554, followed by a making a decision in step 572 whether to continue the IMS session. If it is decided in step 572 to discontinue the IMS session, then it is ended in step 599. Otherwise, the process continues, proceeding to step 504 where the IMS users continue to participate in the IMS session.

However, if it is decided in step 526 that the recipient of the invitation has a user identifier for the virtual world selected by the originator, then a decision is made by the recipient in step 532 whether or not they choose to use a user identity in the selected virtual world. If not, the process continues, proceeding to step 534 where a decision is made whether to suggest changing the venue of the session to a different virtual world. Otherwise, the receiver of the invitation selects a user identifier in step 542 to use in the virtual world session and the process continues by proceeding to step 550. However, if it is decided in step 544 that a change in venue is acceptable for the virtual world session, then the originator of the invitation selects a user identifier in step 548 for use in the suggested virtual world. The process then continues by proceeding to step 550.

In step 550, a decision is made whether to initiate the session in the agreed-upon virtual world venue. If not, then the process continues, proceeding to step 552. Otherwise, virtual world user identifier information is retrieved in step 556 to log the IMS users into the agreed-upon virtual world venue. In one embodiment, the virtual world user identifier information is stored in a table, cross-referenced to each IMS user's IMS user identifier. The IMS users then log into the agreed-upon virtual world venue. In another embodiment, the virtual world user identifier information is used to automatically log each IMS user into the agreed-upon virtual world venue. A decision is then made in step 558 whether or not to conduct a secured session in the virtual world. if so, then a secure virtual world session is initiated in step 560. Otherwise, or once the secure virtual world session is initiated in step 560, the IMS users are logged into the agreed-upon virtual world in step 562. A decision is then made in step 564 whether the IMS users who have logged into the virtual world are to remain logged into the IMS session. If so, then the IMS users are logged out of the IMS session in step 568. Otherwise, the IMS users are left logged into the IMS session in step 566. Whether or not the IMS users remain logged into the IMS session, a decision is made in step 570 whether the invitation comprised a specified location within the virtual world session to conduct the session. If so, then the initiation of the virtual world session proceeds at the specified address in step 571. In one embodiment, the specified address is determined by the network affiliation of the IMS user. Otherwise, the initiation of the virtual world session proceeds at a default address within the virtual world in step 572.

Whether the location of the virtual world session is specified within the invitation or not, a decision is made in step 573 whether a visual indicator will be applied to the avatar of the virtual world identifier of the IMS user. In one embodiment, the visual indicator identifies avatar, and its associated IMS user, as a participant in the virtual world session. If it is decided to apply a visual indicator to the avatar, then it is applied in step 574. Once the visual indicator has been applied, or if its decided in step 573 to not apply a visual indicator, a decision is made in step 576 whether a transcript of the IMS session is to be provided to the IMS users participating in the virtual world session. If so, the transcript of the IMS session is transferred to participants in the virtual world session in step 578. In one embodiment, the transcript is transferred as a result of at least one IMS user logging into the virtual world session. In another embodiment, the associated characteristics and attributes of the IMS session transcript are transferred with the transcript. Otherwise, or once the IMS session transcript has been transferred, a decision is made in step 580 whether predetermined resources are to be provided to the IMS users participating in the virtual world session. If so, then the predetermined resources are transferred to participants in the virtual world session in step 582. As used herein, a resource is defined as any digital information that is operable to be used within a virtual world by a user. For example, such resources may include documents, files, objects and other items operable to be used collaboratively in a virtual environment. In one embodiment, the predetermined resources comprise an electronic presentation. In another embodiment, the predetermined resources comprise graphics files. In yet another embodiment, the predetermined resources comprise video files. It will be appreciated that many such embodiments are possible. If it is decided not to transfer predetermined resources to the virtual world session, or once the predetermined resources have been transferred, the logged-in virtual world session participants wait for other invitees in step 584 to log into the agreed-upon virtual world venue.

A decision is then made in step 586 whether all invited IMS users have logged into the virtual world session. If not, the process continues, proceeding to step 584. Otherwise, the IMS users participate in the virtual world session in step 588. A decision is then made in step 590 whether or not to end the virtual world session. If not, the process continues, proceeding to step 588 where participation in the virtual world session continues. Otherwise, the virtual world session is exited in step 592. A decision is then made in step 594 whether to continue participation in the IMS session. If not, then the IMS session is ended in step 599. Otherwise, a decision is made in step 596 whether the IMS user is logged out of the IMS session. If so, then the IMS user is logged back into the IMS session in step 598. The process then continues, proceeding to step 504.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of skill in the art without departing from the scope and spirit of the invention. The embodiment was chosen and described in order to best explain the principles of the invention and the practical application, and to enable others of skill in the art to understand the invention for various embodiments with various modifications as are suited to the particular use contemplated.

Having thus described the invention of the present application in detail and by reference to preferred embodiments thereof, it will be apparent that modifications and variations are possible without departing from the scope of the invention defined in the appended claims.

What is claimed is:

1. A computer-implementable method for initiating a session in a virtual world, the virtual world being graphically oriented to facilitate collaboration, comprising:
   providing a registry for an instant messaging system (IMS), the registry comprising a plurality of IMS user identifiers and a plurality of virtual world user identifiers;
   indexing the IMS user identifier of a user to a virtual world identifier of the user;
   enabling generation of an invitation as a result of an IMS session to participate in a session in a virtual world, the invitation being generated by a first IMS user and comprising the IMS user identifier of the first user, the name of the virtual world, and the virtual world identifier of the first user;
   delivering the invitation to a second IMS user for acceptance as a result of the IMS session;
   enabling acceptance of the invitation, the acceptance logging the first and second IMS users into a virtual world session in the virtual world; and wherein
   each of the plurality of virtual world identifiers is associated with at least one virtual world and comprises login information for its associated at least one virtual world;
      wherein the invitation comprises at least one of: a default location for the session in the virtual world; a location for the session in the virtual world selected by at least one of the first user and the second user; and a location for the session in the virtual world determined by the network affiliation of the first and second user;
      wherein the second IMS user responds with a suggestion for an alternate virtual world venue for the session, the response, which includes the virtual world user identifier for the second IMS user in the alternate virtual world venue is then sent to the first IMS user.

2. The method of claim 1, wherein predetermined resources are transferred to the virtual world for use in the virtual world session, the predetermined resources comprising at least one of: a transcript of the IMS session; a data file; a document file; a presentation file; a graphics file; a video file; and an object.

3. The method of claim 1, wherein the session in the virtual world is secured.

4. The method of claim 1, wherein:
   the virtual world identifiers of the first and second IMS users are operable to be represented in the virtual world session by an avatar; and
   the avatar comprises a visual identifier operable to indicate that the user associated with the avatar is a participant in the virtual world session which originated from the IMS session.

5. A system comprising:
   a processor;
   a data bus coupled to the processor; and
   a non-transitory computer-usable medium embodying computer program code, the computer-usable medium being coupled to the data bus, the computer program code for initiating a session in a virtual world, the virtual world being graphically oriented to facilitate collaboration, and comprising instructions executable by the processor and configured for:
   providing a registry for an instant messaging system (IMS), the registry comprising a plurality of IMS user identifiers and a plurality of virtual world user identifiers;
   indexing the IMS user identifier of a user to a virtual world identifier of the user;
   enabling generation of an invitation as a result of an IMS session to participate in a session in a virtual world, the invitation being generated by a first IMS user and comprising the IMS user identifier of the first user, the name of the virtual world, and the virtual world identifier of the first user;
   delivering the invitation to a second IMS user for acceptance during the IMS session;
   wherein the invitation comprises at least one of: a default location for the session in the virtual world; a location for the session in the virtual world selected by at least one of the first user and the second user; and a location for the session in the virtual world determined by the network affiliation of the first and second user;

wherein the second IMS user responds with a suggestion for an alternate virtual world venue for the session, the response, which includes the virtual world user identifier for the second IMS user in the alternate virtual world venue is then sent to the first IMS user; and enabling acceptance of the invitation, the acceptance logging the first and second IMS users into a virtual world session in the virtual world; and wherein each of the plurality of virtual world identifiers is associated with at least one virtual world and comprises login information for its associated at least one virtual world.

6. The system of claim 5, wherein predetermined resources are transferred to the virtual world for use in the virtual world session, the predetermined resources comprising at least one of: a transcript of the IMS session; a data file; a document file; a presentation file; a graphics file; a video file; and an object.

7. The system of claim 5, wherein the session in the virtual world is secured.

8. The system of claim 5, wherein:
the virtual world identifiers of the first and second IMS users are operable to be represented in the virtual world session by an avatar; and
the avatar comprises a visual identifier operable to indicate that the user associated with the avatar is a participant in the virtual world session.

9. A tangible computer-usable medium embodying computer program code, the computer program code comprising computer executable instructions configured for:
providing a registry for an instant messaging system (IMS), the registry comprising a plurality of IMS user identifiers and a plurality of virtual world user identifiers;
indexing the IMS user identifier of a user to a virtual world identifier of the user;
enabling generation of an invitation as a result of an IMS session to participate in a session in a virtual world, the virtual world being graphically oriented to facilitate collaboration, the invitation being generated by a first IMS user and comprising the IMS user identifier of the first user, the name of the virtual world, and the virtual world identifier of the first user;
delivering the invitation to a second IMS user for acceptance during the IMS session;

wherein the invitation comprises: a default location for the session in the virtual world; a location for the session in the virtual word selected by at east one of the first user and the second user; and a location for the session in the virtual world determined by the network affiliation of the first and second user; and wherein the second IMS user responds with a suggestion for an alternate virtual world venue for the session, the response, which includes the virtual world user identifier for the second IMS user in the alternate virtual world venue is then sent to the first IMS user; and enabling acceptance of the invitation, the acceptance logging the first and second IMS users into a virtual world session in the virtual world; and wherein each of the plurality of virtual world identifiers is associated with at least one virtual world and comprises login information for its associated at least one virtual world.

10. The computer usable medium of claim 9, wherein predetermined resources are transferred to the virtual world for use in the virtual world session, the predetermined resources comprising at least one of: a transcript of the IMS session; a data file; a document file; a presentation file; a graphics file; a video file; and an object.

11. The computer usable medium of claim 9, wherein the session in the virtual world is secured.

12. The computer usable medium of claim 9, wherein:
the virtual world identifiers of the first and second IMS users are operable to be represented in the virtual world session by an avatar; and
the avatar comprises a visual identifier operable to indicate that the user associated with the avatar is a participant in the virtual world session.

13. The computer usable medium of claim 9, wherein the computer executable instructions are deployable to a client computer from a server at a remote location.

14. The computer usable medium of claim 9, wherein the computer executable instructions are provided by a service provider to a customer on an on-demand basis.

* * * * *